J. TREES.
Steam-Injectors.

No. 154,356. Patented Aug. 25, 1874.

Witnesses:  
H. L. Perine.  
Wm. E. Chaffee.

Inventor:  
James Trees  
Per:  
A. C. Bradley  
atty.

UNITED STATES PATENT OFFICE.

JAMES TREES, OF WESTMORELAND COUNTY, PENNSYLVANIA.

IMPROVEMENT IN STEAM-INJECTORS.

Specification forming part of Letters Patent No. 154,356, dated August 25, 1874; application filed April 29, 1874.

*To all whom it may concern:*

Be it known that I, JAMES TREES, of the county of Westmoreland, State of Pennsylvania, have invented an Improved Steam-Injector, of which the following is a specification:

This invention relates to that class of devices termed "steam-injectors," which, for heating, propelling, or other purposes, are used to inject steam into water and other fluids. It consists in combining with an external casing or pipe, arranged to convey the water or other fluid, an internal cone so constructed as to convey and discharge steam through two or more apertures located, with respect to the volume of water upon which they act, at or near the outside of such volume, either with or without a centrally-discharging aperture.

Figure 1:
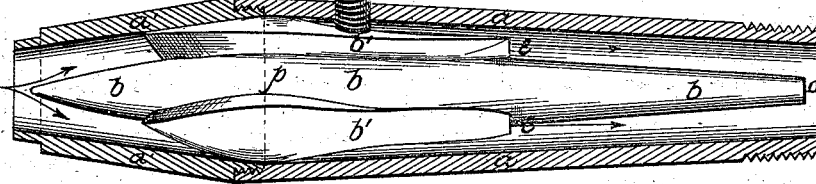
Figures 2, 3:
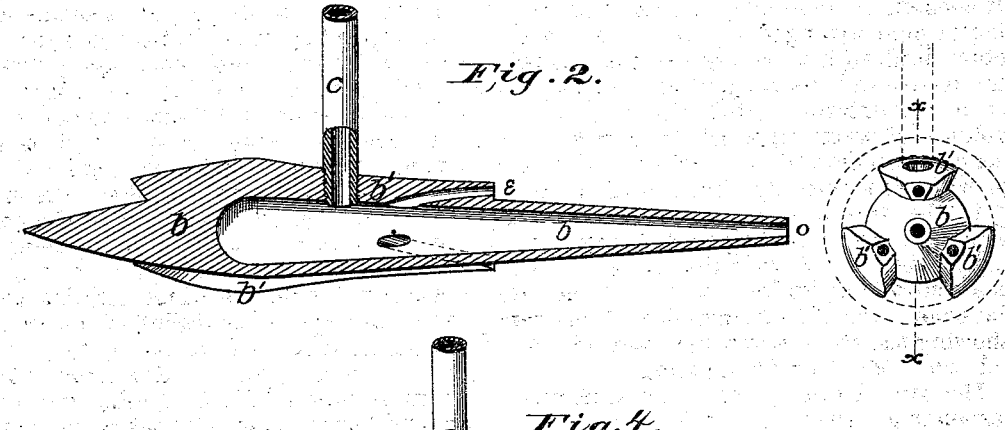
Figure 4:
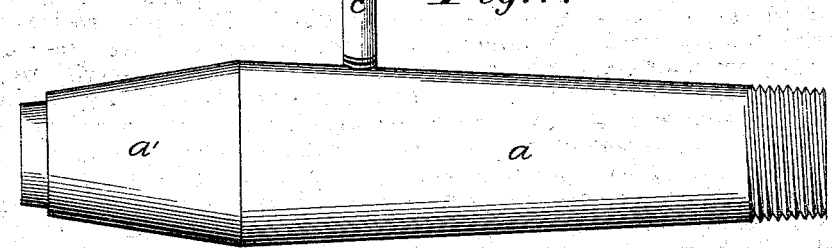

In the drawings, Figure 1 is a central longitudinal section of the external casing, showing a side view of the internal cone. Fig. 2 is a central longitudinal section of the internal cone. Fig. 3 is an end view of the same, showing the steam-apertures; and Fig. 4 is a side view of the external casing.

The same letters of reference indicate corresponding parts in the various figures.

*a* and *a'* are the two sections of pipe or external casing through which the water is conducted. They are coniform, and their broader bases are connected by a screw-joint. The section *a'* is the shorter of the two and more sloping. Within the external pipe, or combined cones *a a'*, a center cone, *b*, provided with three wings, *b'*, is arranged, the peculiar conformation and object of which will now be explained. The body or main center cone *b* is hollow, cigar-shaped, closed at its sharply-pointed end, and provided with a steam-discharging aperture at the other, and the wings *b'* are cast with or secured to it, and form communicating chambers. The annular conformation of these wings is such that about their center of mass they fit snugly within the exterior casing *a a'*, and, when the two sections are screwed together, the center cone will be held to its position. They are mounted upon the center cone about the center of mass, and extend only part of the length of said cone. They are so arranged as to leave water-ways between them, and, like the center cone, they are sharply pointed at one end, while the other end is provided with a steam-discharging aperture. From their center of mass to their apertured end they are depressed from the external casing, so as to provide annular water-ways between them and the casing. In one of them, at its top, an aperture is made, corresponding with a similar aperture in section *a* to receive the steam-supply pipe *c*.

Water is admitted into the external casing in the direction of the sharp points of the central cone and wings, passes by them and between the wings, about the annular ways over the wings, and, traveling down the incline of the center cone, is discharged at the other end of the external casing. Steam, being admitted through pipe *c* into the center cone, is discharged through the wings, striking the water in its descent of the incline of the center cone at points distant from its center of volume, and causing it to travel down the short lines with increased velocity, joining the center jet *o*, and forming one solid jet before being discharged. The water receives no sudden obstruction in its passage, the points of the center cone and wings serving to guide it.

In using the apparatus for throwing water, as in a steam fire-engine, the center aperture should be closed.

I claim as my invention—

1. The combination of a water conveying pipe with an internally-arranged steam-cone, provided with discharging-apertures, which act upon the outer portion of the volume of water, with or without a central discharging-aperture, for the purpose specified.

2. The cone *b*, provided with wings *b'* and discharging-apertures *o* and *e*, constructed substantially as and for the purpose set forth.

JAMES TREES.

Witnesses:
WM. H. STEWART,
MONTGOMERY COCHRAN.